Nov. 26, 1968   L. WEICKHARDT   3,412,818
PRECISION BALANCE WITH PARALLEL MOTION LINKAGE
Filed Nov. 15, 1966
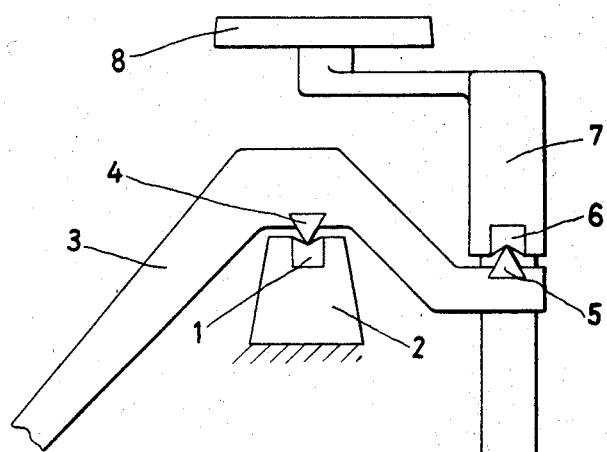
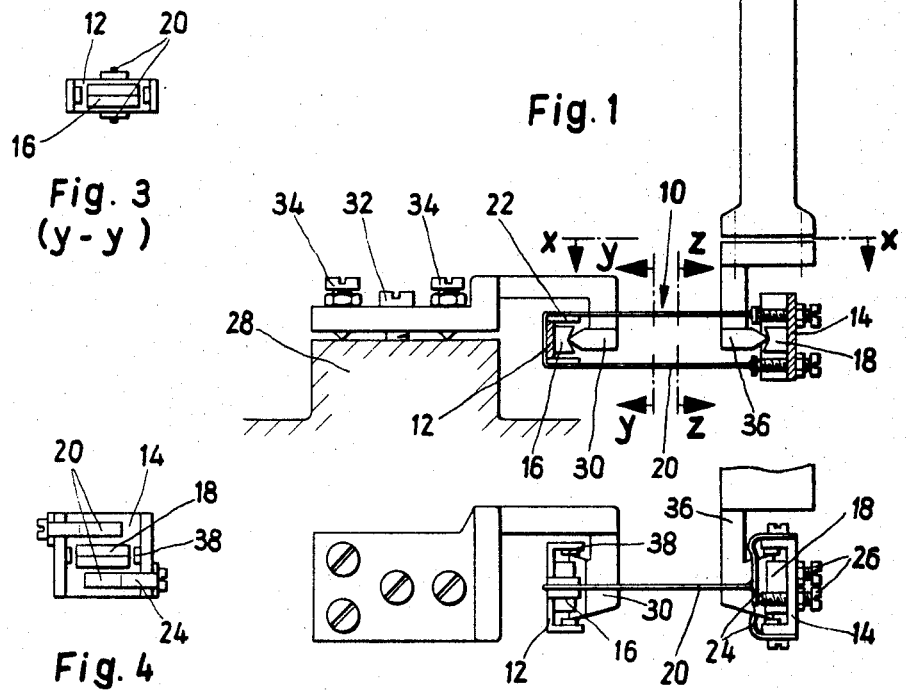
Inventor:
LUDWIG WEICKHARDT.
BY
ATTORNEY.

United States Patent Office 3,412,818
Patented Nov. 26, 1968

3,412,818
PRECISION BALANCE WITH PARALLEL
MOTION LINKAGE
Ludwig Weickhardt, Gottingen, Germany, assignor to Sartorius-Werke GmbH (und vormals Goettinger) Praezisionswaagenfabrik GmbH, a German company
Filed Nov. 15, 1966, Ser. No. 594,608
Claims priority, application Germany, Feb. 18, 1966,
S 102,104
8 Claims. (Cl. 177—255)

This invention relates to a precision balance having a pan disposed above a balance beam and a parallel motion linkage for a vertical guidance of the pan carrier.

In balances having a pan disposed above the balance beam, the pan carrier is supported by the outer knife edge of the balance beam and is vertically guided by a linkage. The portion between the main or fulcrum knife edge of the balance beam and the outer knife edge of said beam, on the one hand, and the linkage, on the other hand, form a parallel motion, whose members must have exactly determined lengths if a satisfactory motion is to be obtained so that indication errors due to hysteresis or random error are avoided. For this purpose, the members of the parallel motion must be parallel to each other with high accuracy and of equal length, and all pivotal axes of the parallel motion must be parallel to each other and at right angles to the members of the parallel motion.

For balances having top pans, the conventional linkages provided with knife edges, e.g., according to the German patent specification No. 955, are entirely inadequate. The knife edges tend to wear rapidly in use and the resulting backlash prevents the required accuracy.

It has been attempted to obtain a higher accuracy by ball bearings arranged to form universal joints (German patent specification No. 921,893). The initial torque of the ball bearings, however, involved an excessively high hysteresis.

The linkages have been provided in the form of leaf springs, whose flexing portions close to the gripped points served as joints (British patent specification No. 785,718). An increasing deflection, however, caused an increasing movement of the axis of the joint from its prescribed position so that the length of the linkage was variable.

Other balances have been disclosed in which the linkage comprises flexible tension elements in the form of ribbons (published Dutch application No. 271,607). To hold the pan carrier against tilting, the two ribbons of a linkage disposed in a common, substantially horizontal plane at some distance from each other and wound on rollers at their ends. Upon a movement of the linkage, the ribbons are slightly unwound from one roller and are wound to some extent onto the other roller. Even if such balance is enclosed in a housing, an accumulation of dust or dirt is inevitable after some time. Dust particles may enter between the ribbons and their rollers so that the length of the linkage and the lengths of the vertical sides of the parallelogram vary. In sensitive scales, this results in a wrong reading.

The present invention relates to a precision balance having a pan disposed above a balance beam and a parallel motion linkage for a vertical guidance of a pan carrier, which linkage comprises flexible tension elements and is stressed in tension because the pan is laterally disposed on the pan carrier.

Such balance is characterized according to the invention in that the flexible tension elements of the linkage interconnect mountings for two V-bearings, which are associated each with a knife edge provided on the pan carrier and on a frame of the balance, respectively, and the flexible tension elements consisting preferably of wires are disposed substantially in a plane which is parallel to the plane in which the balance beam is pivotally movable.

The above-mentioned disadvantages are eliminated by this arrangement. The use of knife edges and V-bearings ensures that the length of the linkage will be kept constant. Besides, the knife edge members cooperating with the linkage can be provided with high accuracy so that their knife edges are parallel to the bearing edges of the V-bearing of the fulcrum joint of the balance beam and of the V-bearings, mounted on the pan carrier, of the outer joint. This may be accomplished with the aid of gauges. The V-bearings of the linkage are connected to each other only by the flexible tension elements and will automatically adjust themselves to the associated knife edges. In the resulting parallel motion, within the accuracy required, opposed sides have the same length and are parallel to each other and the four knife edges are parallel to each other and at right angles to the plane in which the parallel motion is movable.

In commercial manufacture, the knife edges on the pan carrier and on the balance frame cannot be adjusted satisfactorily with respect to the V-bearings of the fulcrum joint for the balance beam and of the outer joint provided on the pan carrier. An error in adjustment to an extent of 1–2 microns will become clearly reflected in the weight reading. To the extent of these maladjustments, the knife edge of the movable knife edge member cooperating with the linkage perform a wobbling motion relative to the knife edge of the fixed knife edge member cooperating with the linkage. The flexible tension elements of the linkage afford the advantage that the V-bearings of the linkage follow this slight wobbling motion and automatically compensate the maladjustment, which cannot be eliminated.

In a preferred embodiment of the invention, the knife edge members of the linkage may be adjustably mounted to facilitate their adjustment. To this end, it is a feature of the invention that the mountings for the knife edge members carried by the balance frame and the pan carrier, respectively, are mounted for an adjustment to a position in which they are substantially parallel to the knife edges of the balance beam.

In this embodiment, at least one of the mountings for the knife edge members, particularly the one which is mounted on the balance frame, may be mounted to permit additionally of a vertical adjustment.

An embodiment of the invention will now be explained described by way of example with reference to the accompanying drawing, in which FIG. 1 is a side elevation, partly in section, showing the entire parallel motion for guiding the pan carrier of the balance, FIG. 2 is a top plan view of the linkage, taken on line x—x of FIG. 1, FIG. 3 is an elevation of the left-hand bearing mounting of the linkage, taken on line y—y of FIG. 1, and FIG. 4 is an elevation of the other bearing mounting of the linkage, taken on line z—z of FIG. 1.

A V-bearing 1 of the fulcrum joint of a balance beam 3 comprises two pads, which are arranged one behind the other in a direction which is transverse to the plane of the drawing and mounted in a stationary bearing block 2. In this V-bearing, the balance beam 3 is pivotally mounted with its fulcrum knife edge member 4. An outer knife edge member 5 of the balance beam supports a pan carrier 7 also with two V-bearings 6 consisting of pads. For a vertical parallel guidance of the pan carrier, a linkage according to the invention is provided at the lower end of the pan carrier. A pan 8 is mounted on a protruding arm of the pan carrier 7 in such a manner that the linkage 10 is always stressed in tension.

The linkage 10 has two mountings 12 and 14 for two V-bearings 16 and 18. A wire 20 constitutes the two flexible tension elements of the linkage and extends around the rear of the mounting 12 and is adhered to the rear side and two reversely bent lugs 22 of the mounting. The two ends of the wire 20 are secured to the two end portions of two flexure springs 24. The other ends of the flexure springs are firmly screw-connected to the side walls of the U-shaped mounting 14. The free ends of the springs bear under initial stress on adjusting screws 26, which are threaded in the mounting 14 and carry lock nuts.

A knife edge member 30 is adjustably mounted with the aid of screws 32 and 34 on the balance frame, in the present case on an extension 28 of the baseplate. This arrangement enables a very exact adjustment of the edge of each knife edge member 30 with respect to the bearing edge defined by the pads 1 in the bearing block 2.

By means which are not shown, a knife edge member 36 is mounted at the lower end of the pan carrier 7 in such a manner that the knife edge of the knife edge member 36 can be adjusted to a position in which it is parallel to the bearing edges of the V-bearings 6 in the pan carrier.

The knife edge members 30 and 36 are ground to a bevel at their ends to form tips, which are aligned with the knife edges. These points are inserted between abutments 38 on the mountings 12 and 14.

The adjusting screws 26 can be actuated to adjust the two sections of the wire 20 to the same length and to change the length of the linkage as a whole. In this way, the effective length of the linkage can be adjusted with the required accuracy to the distance between the knife edges of the knife edge members 4 and 5. The adjusting screws 34 can be operated to adjust the knife edge of the knife edge member 30 to a position in which said knife edge is parallel to the bearing edge of the V-bearing 1 of the fulcrum joint.

The elevation of the knife edge member 30 can be varied with the aid of the screw 32 to adjust the length of the left-hand side of the parallel motion to that of the right-hand side of the parallel motion. Finally, the knife edge of knife edge member 36 may be adjusted to be parallel to the bearing edge 5 of the outer joint. With slight bending of the wire 20, the V-bearings 16 and 18 adjust themselves automatically and without friction to the respective knife edge members so that any slight residual maladjustments of the knife edge members of the linkage will be compensated. The two sections of the wire 20 are then disposed substantially in a plane which is parallel to the plane in which the balance beam is pivotally movable.

What is claimed is:

1. A precision balance, which comprises a frame, a balance beam, a pan carrier, a fulcrum joint connecting said balance beam to said frame for a pivotal movement in a pre-determined plane, an outer joint pivotally connecting said pan carrier to said beam, first and second knife edges provided on said frame and said pan carrier, respectively, and a parallel motion linkage for a vertical guidance of said pan carrier, said linkage comprising first and second V-bearings engaging said first and second knife edges, respectively, first and second mountings carrying said first and second V-bearings, respectively, and spaced apart, parallel tension elements connecting said first and second mountings and extending substantially in a plane which is parallel to said predetermined plane, said pan carrier carrying a pan which is disposed above said beam and laterally with respect to said pan carrier so that said linkage is stressed in tension.

2. A precision balance as set forth in claim 1, in which said tension elements comprise wires.

3. A precision balance as set forth in claim 1, which comprises means for adjusting the effective length of said linkage.

4. A precision balance as set forth in claim 3, which comprises two springs which are secured to one of said mountings, two adjusting screws threaded in said one mounting, said two springs having free end portions bearing under initial stress on said two adjusting screws, respectively, each of said end portions being connected to one of said tension elements at one end thereof.

5. A precision balance as set forth in claim 1, which comprises adjustable means connecting said tension elements to at least one of said mountings so as to enable an adjustment of the effective length of said linkage.

6. A precision balance as set forth in claim 1, in which said balance beam is provided with parallel knife edges forming part of said fulcrum and outer joints, respectively, and which comprises knife edge mountings carrying knife edge members formed with said first and second knife edges, said knife edge mountings being mounted on said frame and pan carrier, respectively, for an adjustment relative thereto to a position in which said first and second knife edges are substantially parallel to said parallel knife edges provided on said balance beam.

7. A precision balance as set forth in claim 6, in which at least one of said knife edge mountings is adjustable in a vertical direction.

8. A precision balance as set forth in claim 7, in which said one knife edge mounting is directly carried by said frame.

References Cited

UNITED STATES PATENTS

| | | | |
|---|---|---|---|
| 2,812,935 | 11/1957 | Mettler et al. | 177—255 |
| 3,193,030 | 7/1965 | Meier | 177—195 X |
| 3,217,820 | 11/1965 | Ast | 177—255 X |

FOREIGN PATENTS

| | | |
|---|---|---|
| 984,400 | 2/1965 | Great Britain. |

ROBERT S. WARD, JR., *Primary Examiner.*

LAURENCE H. HAMBLEN, *Assistant Examiner.*